Oct. 30, 1962     C. H. MAY     3,060,912

FUEL INJECTOR-IGNITER

Filed Feb. 15, 1960     5 Sheets-Sheet 1

INVENTOR.
Claude H. May
BY
Harness, Dickey & Pierce
ATTORNEYS

Oct. 30, 1962        C. H. MAY        3,060,912

FUEL INJECTOR-IGNITER

Filed Feb. 15, 1960        5 Sheets-Sheet 5

INVENTOR.
Claude H. May
BY
Harness, Dickey & Pierce
ATTORNEYS

United States Patent Office 3,060,912
Patented Oct. 30, 1962

3,060,912
FUEL INJECTOR-IGNITER
Claude H. May, Racine, Wis., assignor to Walker Manufacturing Company, Racine, Wis., a corporation of Delaware
Filed Feb. 15, 1960, Ser. No. 8,784
9 Claims. (Cl. 123—33)

My invention relates generally to internal combustion engines, and more particularly to combustion systems for internal combustion engines.

Internal combustion engines function to produce useful work from a portion of the energy released by the high temperature combustion of a fuel. Relatively direct utilization of such energy is ordinarily effected by confining the hot, high pressure combustion products within a combustion chamber, for example a working cylinder, wherein the products generally act directly upon a reciprocable piston to produce useful work.

Generally, a major portion of the material introduced into such a working cylinder comprises atmospheric air which supplies the oxygen necessary for combustion. The air is normally compressed to a pressure materially above atmospheric pressure and the fuel is admixed therewith either before or after compression of the air.

Conventional internal combustion piston-type engines can be categorized by the manner of igniting the aforesaid fuel charge, namely by compression of air to a pressure and temperature sufficiently high to induce self-ignition of the fuel upon introduction thereof into the cylinder or by electrical means such as a spark plug.

Conventional diesel engines fall into the first category, early models of which utilized a supply of compressed air to inject a metered quantity of fuel in a finely divided spray into the working cylinder of the engine near the end of the compression stroke. The compression ratio of the engine was made sufficiently high to ensure that the temperature of the air within the working cylinder at the end of compression would ignite the droplets of fuel injected thereinto. In later designs of compression ignition engines, separate air compressors to effect atomization of the fuel were eliminated by the use of injection systems in which the fuel itself was submitted to high pressure by a pumping device, atomization being achieved by injecting the fuel at high velocity into the working cylinder.

From heat transfer considerations it will be seen that, in both of the aforementioned systems of injection, namely, "air injection" and "solid injection" as they are usually designated, a time interval must elapse from the moment when injection begins to the instant when ignition of the droplets occurs. The fuel droplets are at a relatively low temperature and must be heated, at least on the surface, to a temperature sufficiently high to effect vaporization and air admixing before self-ignition can occur. The use of high injection pressures produces small droplets with higher surface to volume ratio thereby improving heat transfer rates, but ignition lag, although reduced, is still an important factor. The use of very high injection pressures to produce very small droplets is in general precluded by another consideration, namely, that very fine sprays do not penetrate sufficiently into the compressed air mass in the combustion chamber for satisfactory progress of combustion to occur in the time available.

With slow speed compression ignition engines, ignition lag, measured in terms of degrees of crank rotation, is not large, but at high engine speeds this lag represents a considerable percentage of the total time interval available for combustion. Thus, at high engine speeds a large percentage of the total fuel charge has been injected into the combustion chamber before ignition begins. At these high engine speeds, the degree of air turbulence is very high and propagation of combustion in the considerable quantity of fuel already injected by this time is relatively rapid precluding smooth "knock-free" operation. Thus, if the start of injection is timed to start comparatively early in relation to the top dead center position of the piston at the end of the compression stroke, the extremely rapid pressure rise resulting from the combustion of the accumulated fuel can produce dangerously high pressures in the cylinder at top dead center. If the start of injection is delayed to obviate this factor, power is lost from the late burning of the last portion of the fuel to be injected materially reducing combustion and expansion efficiencies.

With the foregoing in mind, as pertaining to compression ignition engines, it is the broad purpose of my invention to provide a system of injection and ignition which injects the fuel into the working cylinder in an ignited condition, thereby eliminating ignition lag with its attendant disadvantages. With such a system, injection and combustion can be initiated at any desired position with respect to top dead center of the piston, in order to produce optimum combustion characteristics. Since unburned fuel cannot accumulate in the combustion chamber, the rate of injection of fuel can be controlled to produce combustion at fairly constant pressure, tending to minimize bearing loads, eliminate combustion knock and, by lowering the maximum temperature, reduce the extent of dissociation of the carbon dioxide molecules. This dissociation is known to occur to a greater extent at high temperatures and represents a considerable loss in combustion efficiency.

Turning now to spark ignition engines, as commonly used in motor vehicles, fuel is introduced into the working cylinder in the form of a mixture of fuel and air. This fuel, commonly gasoline, is metered into the induced air charge by a carburetor or similar device and is thus subjected to the temperatures and pressures of the compression process up to the moment when ignition is initiated by a high voltage spark at the electrodes of a spark plug. Two serious disadvantages accompany this system of fuel metering and ignition. The first disadvantage is that the whole of the fuel charge is present in the combustion chamber in a vaporized state at the moment of ignition which, under certain conditions, leads to an uncontrolled and extremely rapid spread of combustion, commonly called knock or detonation. This condition has required the careful design of the shape of the combustion chamber and the use of anti-knock fuel additives.

The second disadvantage is related to the relatively long period of time that the fuel molecules are subjected to increasing temperature and pressure during the period of compression and the early stages of combustion. It has been shown that the phenomenon of knock in a gasoline engine is preceded by certain "cool-flame" chemical reactions that lead to an instantaneous spread of combustion resulting in audible knock. Time is essential for these pre-combustion reactions. Thus, an engine is more prone to knock at low operating speeds, other conditions being equal, than at high speeds. Such knock creates a serious limitation on engine design that may limit compression ratio and require the use of expensive anti-knock gasolines.

Thus, with respect to spark-ignition engines, it is the purpose of my invention to remove the above disadvantages by the simultaneous injection-ignition of the fuel charge. In my system of injection, a metered quantity of fuel is retained in liquid form until the onset of injection when it is injected and ignited in a continuous stream of burning droplets, ignition occurring prior to entry of the fuel into the working cylinder. Control of the speed of combustion and the rate of pressure rise in the working cylinder is relatively simple with such a system, since the rate of injection can be varied to meet the requirements of any particular engine. Moreover, no portion of the fuel charge is subjected to a temperature-time process, as with the carbureted engine, which can lead to the onset of the undesirable pre-combustion reactions. Such a system of injection-ignition can be operated at high compression ratios on fuels of low octane rating, thus reducing the deleterious collateral effects of anti-knock additives.

As distinct from the compression ignited engine in which the amount of fuel supplied for a given quantity of air can be reduced for part load operation, the spark-ignited engine is limited to a narrow band of air fuel ratios. For the spark-ignited engine part load operation is accomplished by reducing the total mixture weight introduced into the working cylinder. Also, a particular deficiency of the carbureted spark-ignited gasoline engine, when used in an automobile, is the need to provide an overrich mixture in certain operating conditions to ensure satisfactory ignition. Thus, when the engine is idling, when accelerating, and also when decelerating with nearly closed throttle, it is necesasry to provide a mixture strength that is so rich that considerable quantities of carbon monoxide and incompletely burned hydrocarbons are produced.

By simultaneously injecting and igniting the fuel, in the manner of my invention, by a restricted quantity of air at high temperature, ignition can be initiated in a relatively rich enviroment, complete combustion of the burning droplets being achieved upon propagation thereof in the remainder of the air in the working cylinder irrespective of the quantity of such air. Therefore, by means of the improved system of combustion, which is the subject of the invention, satisfactory ignition and more complete combustion can be achieved of the small quantities of fuel necessary for starting and the maintenance of idle running. During deceleration the device may be so arranged that no fuel at all is admitted to the working cylinder.

Simultaneous injection and ignition of the fuel charge, in accordance with my improved combustion system, exploits the advantages of high compression with its attendant increase in thermal efficiency. Also, concurrent injection and ignition of the fuel charge effects an increase in thermal efficiency by maximizing the ratio between the volume of the working cylinder at the end of expansion of the combustion products and the volume of the working cylinder at the beginning of expansion thereof. This presents a distinct improvement over compression ignition engines heretofore known and used in that thermal efficiency in a compression ignition engine using my novel combustion system now can theoretically equal or better the thermal efficiency of a spark ignition engine of like compression ratio.

Accordingly, the broad object of the present invention is to provide an improved combustion system for an internal combustion engine.

It is also a basic purpose of my invention to provide a new combustion system that eliminates the ignition lag v. knock dilemma presented by conventional combustion systems and make it possible to obtain the benefits of diesel cycle operation resulting from high compression of air only without the heretofore inherent disadvantages associated with ignition lag.

Another object is to provide a fuel ignition igniter that concurrently ejects and ignites a fuel.

Another object is a fuel injector-igniter wherein the ignition occurs at the onset of fuel injection and is of a continuous nature precluding "ignition lag" prior to the initiation of combustion.

Another object is to provide a fuel injector-igniter that is usable in conventional gasoline engines.

Another object is to provide a fuel injector-ignitor wherein the compression within the combustion chamber of an engine is the operating means.

Another object is to provide a differential pressure actuated fuel injector-igniter.

Another object is to utilize pressure rise characteristics in a combustion chamber to control the discharge orifice dimension of a fuel injector-igniter.

Another object is to provide a device which can control the rate of combustion and thereby cause an engine to operate substantially on a constant pressure cycle.

A still further object of the invention is to provide a fuel injector-igniter having a self-contained fuel metering means.

Another object is to provide a fuel injector-igniter usable in place of the spark plug of a conventional engine.

Another object is to provide a construction for a fuel injector-igniter wherein one operating element thereof forms one of the boundaries of the combustion chamber of the engine.

Another object is to provide a fuel injector-igniter having means for raising the injection air temperature sufficiently to insure positive ignition of a fuel charge irrespective of ambient temperature.

Another object is to provide a fuel injector-igniter which will pulverize the fuel to such an extreme degree that combustion efficiency will be markedly increased, less "excess air" will be required, and the amount of incompletely burned constituents will be greatly reduced.

A further object is to provide a fuel injector-igniter having a simple linkage for controlling fuel feed to a plurality of units.

Another object of the invention is the provision of a metering pump means integral with the fuel injector-igniter.

Another object is to provide a fuel injector-igniter having simple easily adjusted datum to insure equality of metering in a multi-cylinder installation.

Other objects and advantages of the present invention will become apparent from the following detailed description wherein reference is made to the drawings in which.

Figure 1:
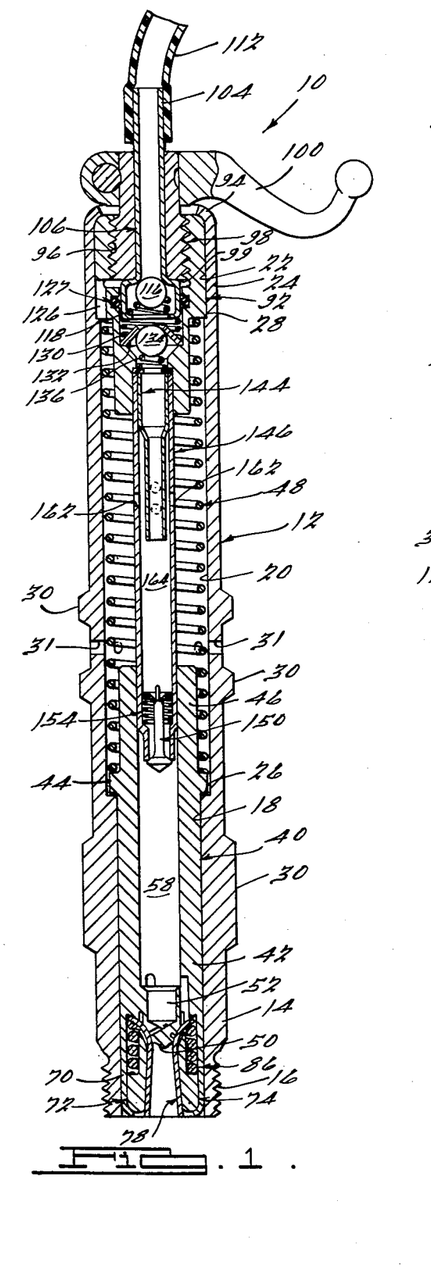
FIGURE 1 is a sectional side elevation of a fuel injector-igniter in accordance with one embodiment of the present invention.

An injector-igniter 10, in accordance with one embodiment of the present invention, comprises a tubular housing 12 having a lower end portion 14 provided with suitable threads 16 for engagement in a threaded aperture, which in certain cases could be the spark plug aperture, in the cylinder head of an internal combustion engine. The housing 12 has a cylindrical internal surface 18 at the lower end 14 thereof, an intermediate cylindrical surface 20 of relatively larger internal diameter than the surface 18, and an upper cylindrical internal surface 22 at an upper end 24 thereof, of relatively larger internal diameter than the surface 20. An annular transverse shoulder 26 extends between the surfaces 18 and 20, and an upper annular transverse shoulder 28 extends between the surfaces 20 and 22. The housing 12 has a plurality of annular ribs 30 on the outer periphery thereof for reinforcing purposes and a plurality of air inlet ports 31 for a reason to be discussed.

An elongated tubular plunger 40 has a lower end portion 42 disposed within the lower end portion 14 of the housing 12 for movement longitudinally thereof. The plunger 40 is of such a diameter with respect to the diameter of the cylindrical internal surface 18 of the housing 12 as to have a sliding substantially fluid sealing fit therein. The plunger 40 has an annular peripheral shoulder or rib 44 thereon that is engageable with the transverse shoulder 26 extending between the surfaces 18 and 20 of the housing 12 to limit downward movement of the plunger 40 with respect to the housing 12. An upper end portion 46 of the plunger 40 functions to guide and maintain an operating spring 48 that normally biases the plunger 40 downwardly with respect to the housing 12.

The lower end portion 42 of the plunger 40 has an end wall 50 thereon that, in conjunction with the end portion 42, defines a fuel pre-chamber 52. The end wall 50 has a downwardly convergent conical internal end face 53, for a reason to be discussed. A plurality of circumferentially spaced vertical passageways 54 extend around and are spaced radially outwardly from the fuel pre-chamber 52 by a wall portion 55. The passageways 54 communicate with an annular air blast annulus 56 that is isolated and spaced radially outwardly from the fuel pre-chamber 52. The passageways 54 also communicate with a compression chamber 58 in the interior of the plunger 40.

A plurality of fuel feed passages 60 extend radially outwardly and angularly downwardly from the fuel pre-chamber 52 and communicate with a fuel annulus 62 that underlies the fuel pre-chamber 52.

The plunger 40 has a downwardly extending tubular extension 70 for the support and retention of a pair of collars 72 and 74. The collars 72 and 74 are retained with respect to the plunger 40 as by spinning over a lower end portion 76 of the tubular extension 70. A tulip valve 78 having a generally arcuate downwardly convergent section 80 leading into a downwardly divergent lower end section 82 is disposed centrally of the split collars 72 and 74. The upper end portion 80 of the tulip valve 78 is biased against a complementary annular valve seat 84 on the end wall 50 of the plunger 40 by a compression spring 86 that extends between shoulders 88 and 90 on the collars 72 and 74, respectively, and the upper end portion 80 of the tulip valve 78. The upper portion 80 of the tulip valve 78 normally closes the air blast annulus 56 and the fuel annulus 62 against the passage of air and fuel outwardly of the compression chamber 58 and fuel pre-chamber 52, respectively, in the plunger 40.

The plunger 40 is normally biased downwardly with respect to the housing 12 by the helical compression spring 48 that extends between the annular shoulder 44 on the plunger 40 and a shoulder 91 on a valve housing 92. The shoulder 91 on the valve housing 92 is engageable with the annular shoulder 28 that extends transversely between the interior bores 20 and 22 of the housing 12 so as to limit downward movement of the valve housing 92 with respect to the housing 12. The valve housing 92 is fixedly held against the shoulder 28 as by spinning over an upper terminal end portion 94 of the housing 12.

The valve housing 92 has a threaded central bore 96 for the acceptance of a suitably threaded fuel metering control screw 98. The control screw 98 is rotatable as by a control lever 100 and is movable axially with respect to the valve housing 92 upon relative rotation therebetween.

The control screw 98 has a central bore 102 therein for the slidable acceptance of an upper end portion 104 of a fuel pump piston 106. A transverse shoulder 99 on the screw 98 limits upward movement of the piston 106. The piston 106 has a central passage 108 that communicates with an inlet chamber 110 therein. A fuel line 112 is sealably connected to the upper end portion 104 of the piston 106 for the conduction of a suitable fuel through the passage 108 to the inlet valve chamber 110.

The inlet valve chamber 110 on the piston 106 has a radially outwardly extending portion 113 that defines an annular valve seat 114 for a fuel inlet valve 116. The fuel inlet valve 116 is normally biased against the valve seat 114 as by a compression spring 118.

The piston 106 has a skirt portion 120, of relatively larger diameter than the upper end portion 104, that is slidable in a fuel pump bore or cavity 122 in the valve housing 92. An inturned lip 124 on the lower end of the skirt 120 provides a seat for the inlet valve spring 118.

The valve housing 92 has a vertical or longitudinally extending passageway 126 on the outer periphery thereof that communicates with a transversely extending annular passageway 128 that in turn communicates with the valve cavity 122 of the valve housing 92. The cavity 122 has an annular groove or recess 125 on the internal surface thereof for the acceptance of a sealing member 127, for example an O-ring, that effects a slidable air and fluid seal between the valve cavity 122 and the skirt portion 120 of the piston 106.

The piston 106 is normally biased upwardly against the shoulder 99 on the control screw 98, as by a helical compression spring 130 that extends between the annular lip 124 on the skirt 120 of the piston 106 and a frusto-conical valve seat 132. The valve seat 132 is sealably biased against a lower end face 133 of the valve cavity 122 by the spring 130 and functions to locate and seat a fuel transfer valve 134. The fuel transfer valve 134 is biased into an aperture 135 in the valve seat 132 by a helical transfer valve spring 136. The transfer valve spring 136 extends between the fuel transfer valve 134 and an annular spring retainer seat 138 that is located with respect to the valve housing 92 by an annular shoulder 140 at the end of a bore 142 in the valve housing 92. The bore 142 in the valve housing 92 communicates with the valve cavity 122 for the passage of fuel downwardly and outwardly thereof.

The passage of fuel outwardly of the valve cavity 122 is controlled by a fuel isolation tube 144 that is fixedly maintained within a tubular ram member 146 as by a press fit. The upper end portion of the ram 146 is sealably secured within the bore 142 of the valve housing as by a press fit, and serves to locate the spring retainer seat 138.

The fuel isolation tube 144 extends downwardly and centrally of the tubular ram 146 so as to prevent excessive break-up of fuel upon the passage thereof downwardly from the fuel pump valve cavity 122.

The tubular ram member 146 has a lower end portion 148 of reduced diameter with an annular chamfered end face 149 thereon for the seating of a complementary ram valve 150. The ram valve 150 has a conical upper end face 151 complementary to the end face 149 on the ram 146, and a lower face 152 complementary to the inner face 53 of the end wall 50 on the plunger 40. The ram valve 150 is biased upwardly against the ram valve seat 149 on the ram 146 by a helical compression spring 153 that extends between an annular shoulder 154 at the upper end of the reduced portion 148 of the ram 146 and a spring retainer 158 that is secured to a stem portion 159 of the ram valve 150, as by staking. The spring retainer 158 has a plurality of apertures 160 for the passage of fuel therethrough. The ram member 146 has a plurality of transverse apertures 162 for the admittance of air into a central chamber 164 thereof, for a reason to be discussed.

Operation of the fuel injector-igniter 10 is initiated upon the compression stroke of the internal combustion engine. As the air pressure in the working cylinder builds up, the plunger 40 is biased upwardly with respect to the housing 12 and ram member 146 against the bias of the operating spring 48. As the plunger 40 rises, air is compressed in the compression chamber 58 of the plunger 40 due to the relative movement between the plunger 40 and the ram member 146. It is to be noted that the area differential between the plunger 40 and ram member 146 effects a relatively high compression of the air within the chamber 58 as related to pressure in the working cylinder effective on the plunger 40.

As the annular collar 44 on the plunger 40 passes the air inlet ports 31 in the tubular housing 12, air is inhaled into an annular chamber 175 (FIG. 2) then existing between the plunger and the internal wall 20 of the housing 12. This air is utilized in a manner to be described.

Figure 2:
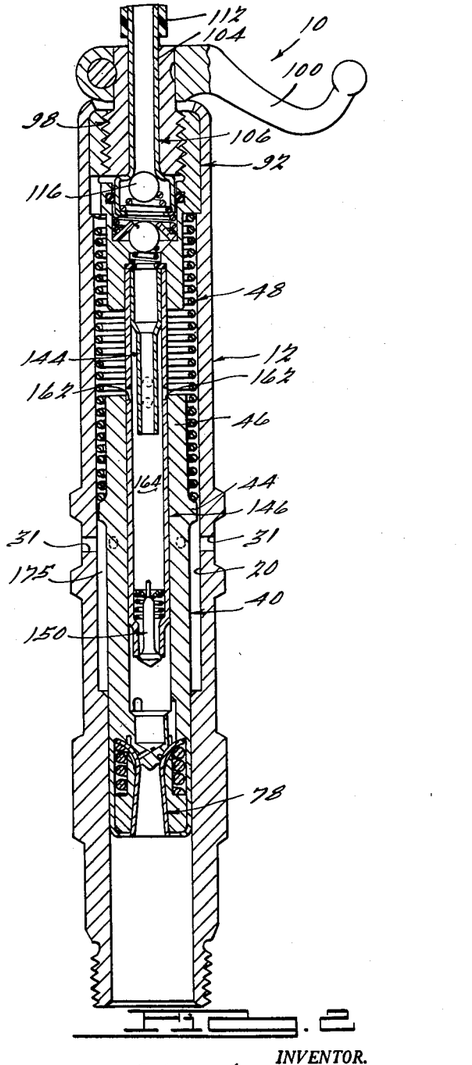
FIG. 2 is a sectional side elevational view, similar to FIG. 1, at an intermediate stage of operation.

The annular collar 44 on the plunger 40 acts as a piston with respect to the internal wall 20 of the housing 12 to raise the pressure of air above the plunger 40. Until such time as the upper end portion 46 of the plunger 40 passes the apertures 162 in the tubular ram 146, air within the chamber 164 of the ram member 146 is compressed. Upon passage of the upper end portion 46 of the plunger 40 past the apertures 162, the central cavity 164 of the ram 146 is effectively sealed.

As the plunger 40 continues to rise under the influence of increased air pressure in the working cylinder, due to a piston moving upwardly on a compression stroke, air above the plunger 40 continues to be compressed until such time as air pressure exerted through the passageways 126 and 128 in the valve housing 92 leading to the upper end wall 113 of the fuel pump piston 106 biases the piston 106 downwardly into the fuel cavity 122 against the spring 130. Movement of the fuel pump piston 106 downwardly under the bias of air pressure on the upper end wall 113 thereof pumps fuel out of the fuel pump cavity 122 by biasing the fuel transfer valve 134 downwardly against the bias of the transfer valve spring 136. Fuel in droplet form then passes downwardly through the isolation tube 144 settling between the stem portion 159 of the ram valve 150 and the reduced diameter end portion 148 of the tubular ram member 146. It is to be noted that during the injection stroke the fuel pump valve 116 remains seated against its valve seat 114, thereby preventing the passage of additional fuel into the fuel pump chamber. The additional compression of air within the chamber 164 due to the entrance of fuel thereinto is insufficient to bias the ram valve 150 to the open position due to the relatively higher pressure in the chamber 58 of the plunger 40.

Figure 3:
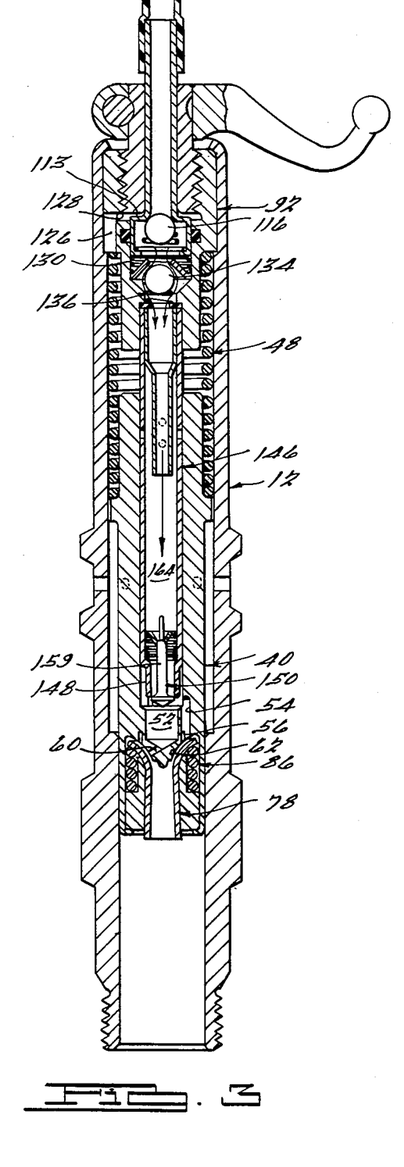
FIG. 3 is a sectional side elevation of the fuel injector-igniter with its plunger in the position of injection and ignition of a fuel charge.

As pressure in the working cylinder approaches a maximum, the plunger 40 approaches its upper limit of movement with respect to the housing 12. At this time, air within the compression chamber 58 of the plunger 40 is compressed sufficiently to reach a temperature substantially above 1000° F. When this condition obtains, the air pressure within the ram compression chamber 58 is sufficient to bias the tulip valve 78 downwardly against the upward bias of the compression spring 86. Upon movement of the tulip valve 78 downwardly, the superheated compressed air within the chamber 58 is injected outwardly through the passages 54 and the air annulus 56 and thereupon draws fuel outwardly through the fuel passageways 60 and fuel annulus 62 into the throat of the tulip valve 78. It is to be noted that the tulip valve 78 is maintainable in the open condition by a relatively lower pressure than required to open the valve 78. Because the air within the compression chamber 58 of the plunger 40 is heated well above the self-ignition temperature of the fuel charge deposited in the fuel pre-chamber 52, the fuel is ignited within the constrictive portion of the tulip valve 78, and is thereafter injected into the working cylinder in the ignited condition. Air and fuel continue to be injected into the working cylinder through the tulip valve 78 until the fuel charge in the fuel pre-chamber 52 is exhausted and until a pressure balance exists between the compression chamber 58 in the plunger 40 and the pressure within the working cylinder.

Figure 4:
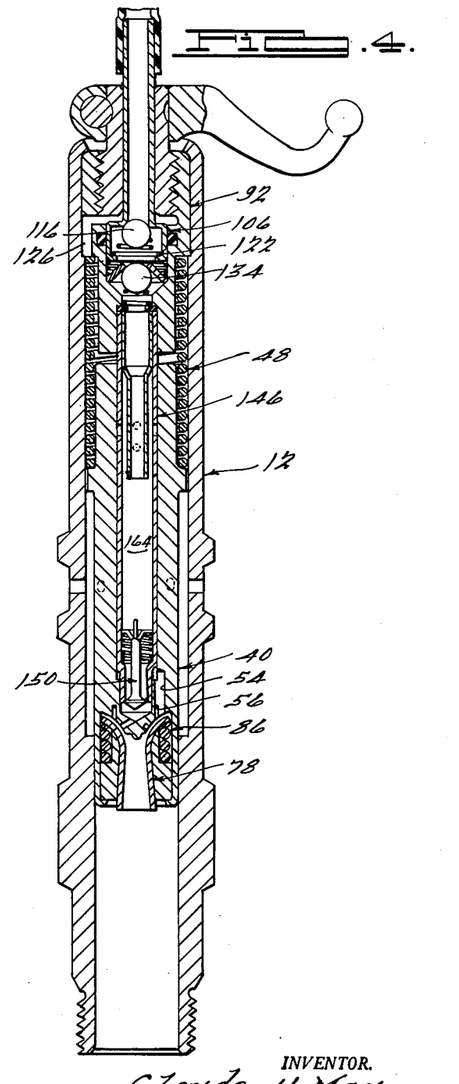
FIG. 4 is a sectional side elevation of the fuel injector-igniter similar to FIG. 3 with its plunger at its uppermost position.
Figure 5:
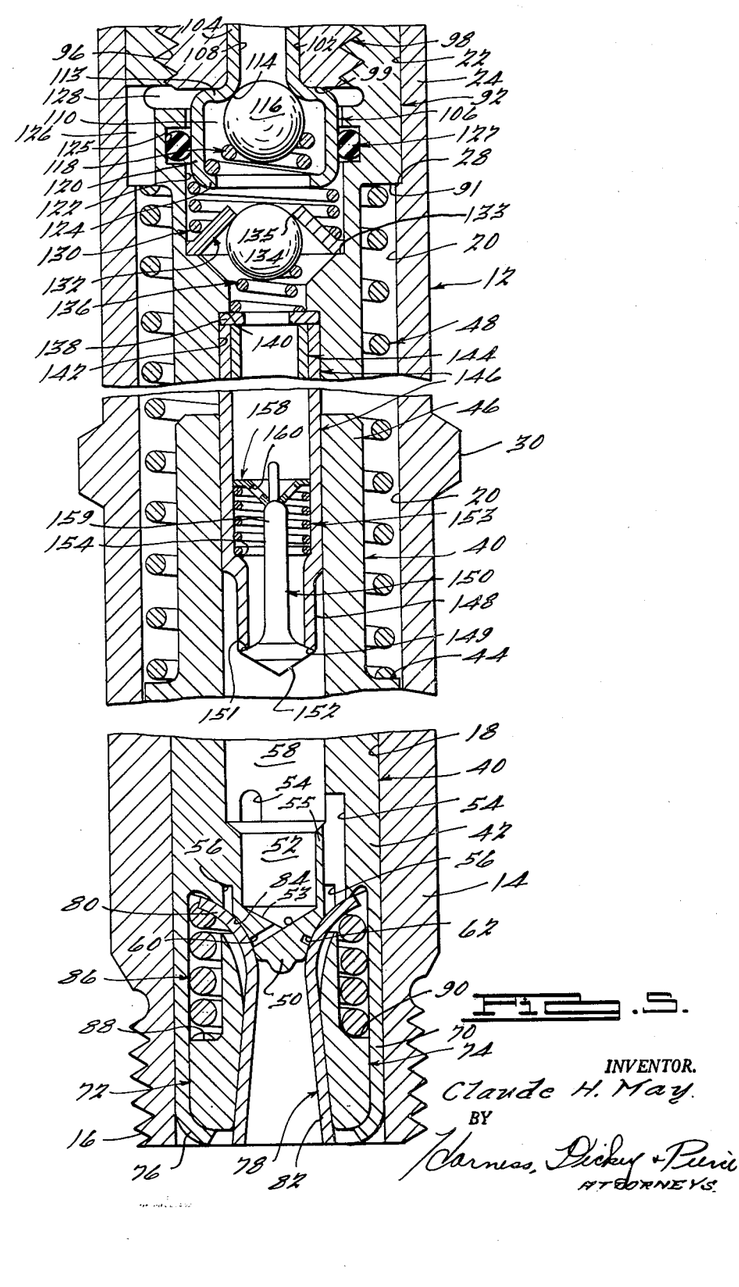
FIG. 5 is a sectional side elevational view of the fuel injector-igniter, partially broken away and enlarged for clarity.

As the piston moves in the expansion phase of its cycle with its associated pressure drop, the plunger 40 is biased downwardly by the helical compression spring 48. The tulip valve 78 is also biased upwardly by the helical valve spring 86. Upon the first increment of relative movement between the plunger 40 and ram 146, the lowered pressure within the fuel pre-chamber 52 creates a pressure differential on opposite sides of the ram valve 150. Therefore, air pressure within the ram chamber 164, due to the compression of the air therein during the initial upward movement of the plunger 40, is effective to open the ram valve 150, thereby depositing a fresh metered charge of fuel within the fuel pre-chamber 52. Air is also transferred to the compression chamber 58 along with the fuel charge due to the pressure differential on opposite sides of the ram valve 150.

As the plunger 40 continues to move downwardly under the bias of the operating spring 48, air trapped in the chamber 175, due to closure of the apertures 31 by the annular collar 44, is compressed, thereby cushioning the downward movement of the plunger 40 with respect to the housing 12 to provide for shock-free return of the plunger 40 to its datum position. The entrapped air then escapes relatively slowly due to leakage around the collar 44.

Upon downward movement of the plunger 40, the fuel pump piston 106 is biased upwardly to its datum position against the shoulder 99 on the control screw 98 by the fuel pump piston spring 130 due to relief of the pressure thereupon. Upon upward movement of the fuel pump piston 106, due to the bias of the fuel pump spring 130, the fuel inlet valve 116 is biased downwardly against its valve spring 118 due to fuel pressure within the fuel inlet tube 112 which is maintained as by a fuel pump (not shown). When a pressure equilibrium is obtained between fuel in the fuel inlet tube 112 and the fuel pump cavity 122, the fuel inlet valve 116 is returned against its valve seat 114, thereby preparing the fuel injector-igniter 10 for its next operation. It is to be noted that the position of the control screw 98 with respect to the valve housing 92 determines the stroke of the fuel pump piston 106 which thereby controls the amount of fluid injected into the fuel pre-chamber 52 upon each operation of the fuel injector-igniter 10.

Referring to FIGS. 6 through 10, the fuel injector-igniter 200 is shown in operative association with a suitable cam finger 202 and cam shaft 204. The injector-igniter 200 comprises a tubular housing or cylinder 210 with a plurality of apertures 211 herein and having a transverse lower end wall 212 with a downwardly convergent conical inner end face 214. The end wall 212 has an annular flange 216 extending downwardly therefrom with an internal threaded portion 218 for the acceptance of a suitable threaded upper end portion 220 of a nozzle 222.

Figure 6:
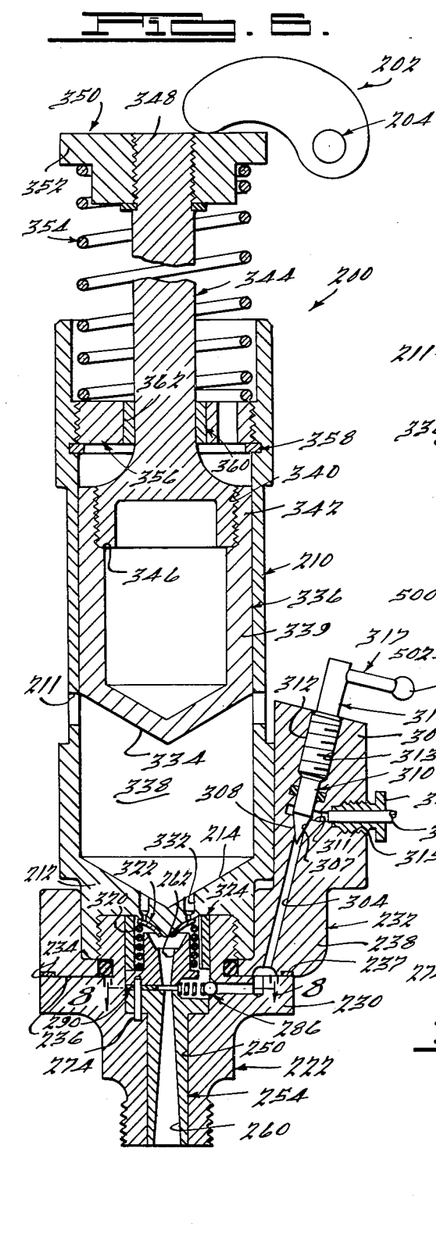
FIG. 6 is a sectional side elevation of a more basic form of fuel injector-igniter shown with its plunger in its uppermost position.

The nozzle 222 has a radially outwardly extending flange 230 thereon for the support of a needle valve housing 232. The needle valve housing 232 has an annular recess 234 in a lower end face 236 thereof for the acceptance of a sealing washer 237.

The needle valve housing 232 comprises an annular collar 238 having a radially inwardly extending flange 240 that is accepted between an end face 242 on the annular flange 216 of the cylinder 210 and an upper end face 243 on the radial flange 230 on the nozzle 222. Advancement of the upper end portion 220 of the nozzle 222 into the threads 218 on the flange 216 effects a pinching of the flange 240 of the needle valve housing 232 so as to hold the housing 232 rigidly with respect to the cylinder 210 and nozzle 222. A sealing washer 244 is interposed between the radially inwardly extending flange 240 on the needle valve housing 232 and the upper end portion 220 of the nozzle 222 so as to effect a fluid seal therebetween.

The nozzle 222 has a central bore 250 therein and a counterbore 252 for the acceptance of a suitable nozzle insert 254. The nozzle insert 254 has a flange 256 at the upper end thereof that is engageable with an end face 258 of the counterbore 252 to effect positive seating of the nozzle insert 254 axially of the nozzle 222. The nozzle insert 254 has a truncated downwardly divergent conical passageway 260 therein that, in conjunction with a truncated downwardly convergent conical passageway 262 in a nozzle plug 264 defines a venturi 265 that extends axially downwardly through the nozzle 222. The nozzle plug 264 has a radially outwardly extending lower end flange 266 of substantially the same diameter as the counterbore 252 in the nozzle 222 so as to locate the nozzle plug 264 radially with respect to the nozzle 222. The flanges 256 and 266 on the nozzle insert 254 and nozzle plug 264, respectively, have axially extending bore 270 and 272 that, when aligned, accommodate an axially extending positioning pin 274. When the positioning pin 274 is disposed in the bores 270 and 272, a lower end portion 275 thereof is accepted in a circular recess 276 in the end face 258 of the counterbore 252 so as to index the nozzle insert 254 and nozzle plug 264 with respect to the nozzle 222. When the nozzle insert 254 and nozzle plug 264 are in the aforementioned index position, a pair of spring retainer recesses 280 and 282 thereon, respectively, are maintained in axially and radially aligned relationship for the accommodation of a transversely extending valve spring 284. The valve spring 284 normally biases a check valve 286 against a conical valve seat 288 at the juncture of a transverse bore 289 with the axial counterbore 252 in the nozzle 222, for a reason to be discussed.

A U-shaped disc 290 is interposed between the nozzle insert 254 and nozzle plug 264 to define a chamber 292 communicating with the venturi 265 defined by the convergent-divergent passages 260 and 262. The disc 290 has a hole 294 therein for the acceptance of the pin 274 so that the disc 290 is indexed to a fixed position with respect to the nozzle 222. The chamber 292 in disc 290 extends radially outwardly into communication with the recesses 280 and 282 in the nozzle insert 254 and nozzle plug 264, respectively, and in conjunction therewith define a fuel pre-chamber 300. The passageway 289 communicates with the fuel pre-chamber 300 and with a generally upward extending passageway 304 in an upper extension 306 of the needle valve housing 232 for the admittance of fuel into the fuel pre-chamber 300. The passageway 304 has a conical seat 307 at the upper end thereof for the acceptance of a complementary conical end face 308 on a needle valve 310. The needle valve 310 has a threaded portion 312 that is accepted in a suitably threaded bore 313 that is aligned with the passageway 304 so as to effect axial movement of the conical face 308 on the needle valve 310 with respect to the seat 307 on relative rotation therebetween thereby to meter the passage of fuel downwardly through the passageway 304. A fuel annulus 311 surrounds the needle valve 310 and communicates with a transverse bore 315 into which a fuel conduit 314 extends. The conduit 314 is held in fluid sealing engagement with respect to the needle valve housing 232 by a conventional self-contracting screw 316. A radially extending arm 317 having a ball 318 at the end thereof is secured to the needle valve 310 to facilitate rotation thereof.

A valve spring 320 is disposed about an upper end portion 321 of the nozzle plug 264 and extends between the radial flange 266 thereon and a tulip valve 322. A spring guide insert 324 surrounds the spring 320 so as to guide the spring for axial movement with respect to the nozzle 222. The spring guide insert 324 has a groove of passage 325 therein that communicates with the fuel pre-chamber 300 and with the end wall 212 of the cylinder 210 for a reason to be discussed.

The spring 320 normally biases the tulip valve 322 upwardly against a complementary downwardly arcuately convergent valve seat 330 on the end wall 212 of the cylinder 210 so as to close a plurality of downwardly extending passages 332. The passages 332 communicate with the inner end face 214 of the cylinder 210 which, in conjunction with a complementary downwardly convergent conical lower end face 334 on a plunger 336, define a compression chamber 338.

The plunger 336 comprises a tubular body portion 339 closed by the end face 334 at the lower end thereof and having an internally threaded portion 340 at an upper end 342 thereof for the acceptance of a plunger stem 344. The plunger stem 344 is seated against a transverse shoulder 346 on the body portion 339 of the plunger 336 to locate the stem 344 axially with respect thereto. The stem 344 has a threaded upper end portion 348 for the acceptance of a spring retainer cap 350. The spring retainer cap 350 has a radial flange 352 thereon for the seating of an operating spring 354 that extends between the cap 350 and a plunger stem guide 356 to normally bias the plunger 336 upwardly with respect to the cylinder 210. The plunger stem guide 356 is threadably accepted within the cylinder 210 and is located axially with respect thereto as by a spring retainer ring 358. A bushing 360 is disposed in a central aperture 362 in the stem guide 356 for the slidable acceptance of the plunger stem 344 for vertical reciprocation under the bias of the operating spring 354 and the cam 202.

Figure 10:
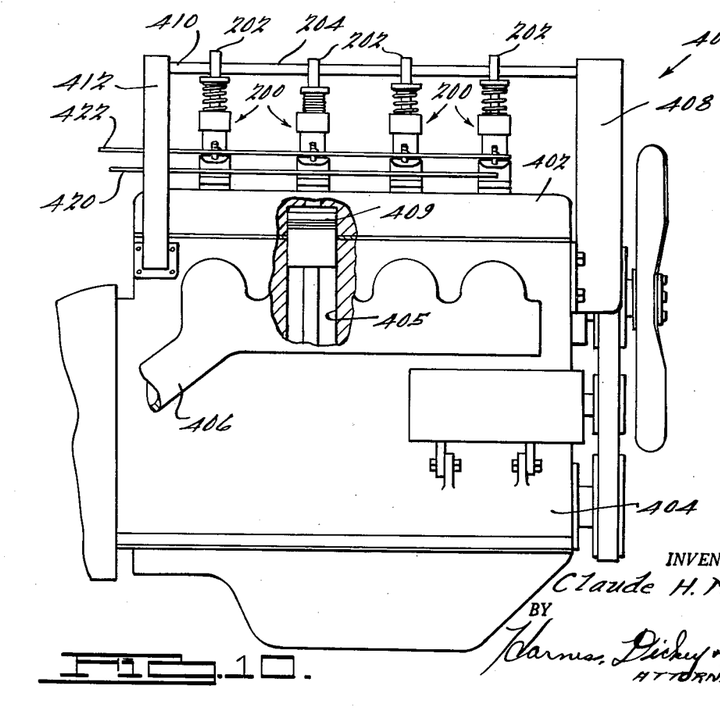
FIG. 10 is a side elevational view of a plurality of fuel injector-igniters in operative association with a conventional internal combustion engine.

Referring to FIG. 10, a plurality of fuel injector-igniters 200 are mounted in operative association on a conventional internal combustion engine 400. The engine 400 comprises a cylinder head 402, a cylinder block 404 having a cylinder 405 therein and an exhaust manifold 406. The engine 400 is provided with a suitable timing mechanism 408 for driving the cam shaft 204, a rear end 410 of which may be supported as by a bracket 412. It is to be understood that the timing mechanism 408, cam shaft 204 and cam 202 may be of any desired configuration so as to operate each of the injector-igniters 200 at an appropriate time during the stroke of its associated piston 409.

Fuel is admitted to the injector-igniters 200 as by a fuel line 420 that is connected to the transversely extending conduits 314 and to a suitable source of fuel under pressure. A throttle linkage 422 is provided for connecting the needle valve arm 317 for simultaneous movement, thereby to control the input of fuel into the respective fuel injector-igniters 200.

Figure 7:
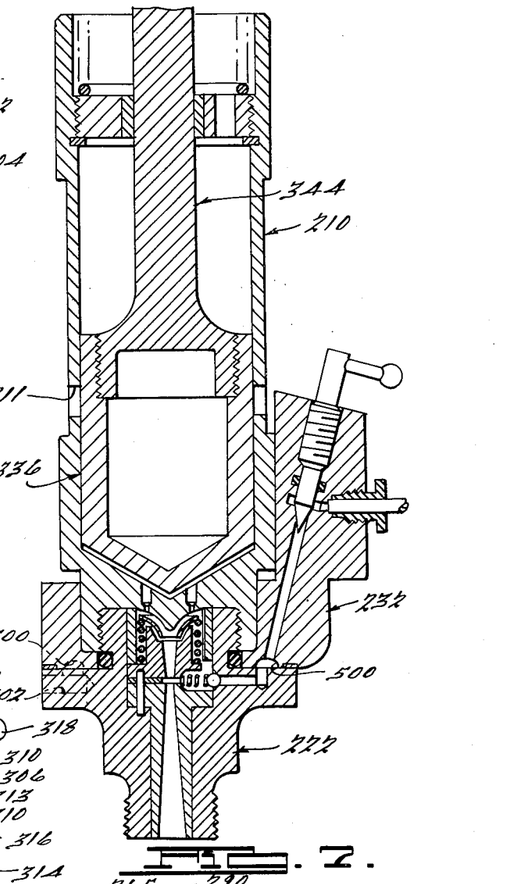
FIG. 7 is a sectional side elevation of the fuel injector-igniter of FIG. 6 with its plunger at a lowermost position.
Figure 8:
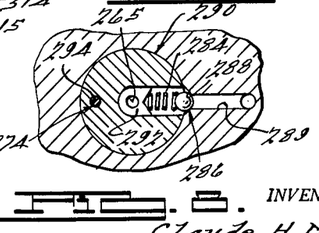
FIG. 8 is a fragmentary cross-sectional view taken along the line 8—8 of FIG. 6.
Figure 9:
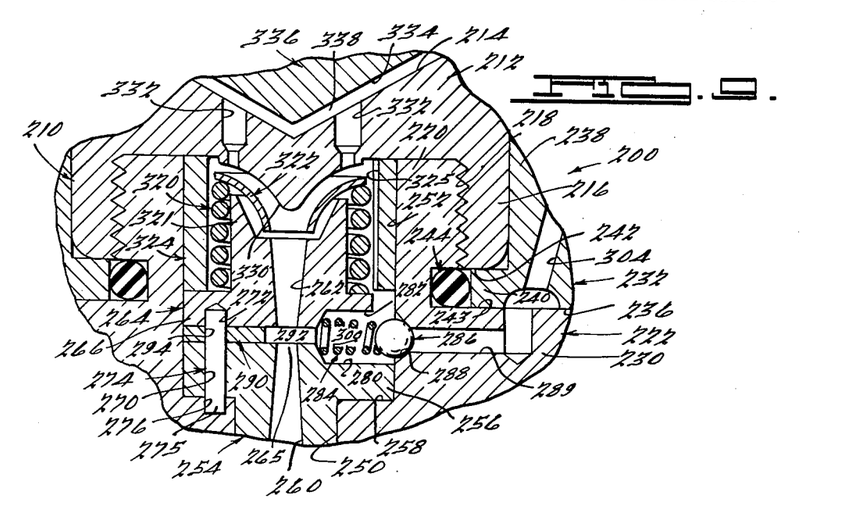
FIG. 9 is a fragmentary cross-sectional view of the valve structure shown in FIG. 7, enlarged for clarity.

Operation of the injector-igniter 200 is initiated upon downward movement of the plunger 336 thereof under the bias of, for example, the cam 202. As the plunger 336 passes the apertures 211 in the housing of cylinder 210, air is enclosed and compressed within the compression chamber 338. Further downward movement of the plunger 336 compresses the air within the chamber 338 sufficiently to bring the temperature thereof substantially above the self-ignition temperature of a fuel deposited within the fuel pre-chamber 300 on a prior stroke. When the pressure of air within the chamber 338 is sufficient to bias the valve 322 downwardly against the upward bias of the valve spring 320, the supercompressed air within the chamber 338 is vented downwardly through the passages 332 and into the downwardly convergent passageway 262 of the venturi 265. The supercompressed air also flows downwardly through the passage 325 communicating with the fuel pre-chamber 300 and, because of the pressure differential between the chamber 292 of the venturi 365 and the fuel pre-chamber 300, biases the fuel charge within the chamber 300 into the venturi 265 wherein the fuel charge and super-compressed air are admixed to ignite the fuel and inject it into the cylinder 405 of the engine 400 in the ignited condition.

After the injection of ignited fuel into the cylinder 405 of the engine 400 and upon upward movement of the plunger 336 under the bias of the spring 354, the valve 322 is biased to its closed position with respect to the passages 332. Fuel under pressure and within the conduit 314 and passage 304 is effective to bias the fuel check valve 286 to the open position against the bias of the spring 284. A metered quantity of fuel is thereby introduced into the fuel pre-chamber 300, the quantity thereof depending upon the relationship between the pressure of the fuel, the adjustment of the needle valve 310 and the speed of engine operation.

Referring to FIG. 7, bi-fuel injection can be accommodated relatively easily as by an annular passage 500 which communicates with the passage 289 and with a transverse bore 502. A suitable fuel conduit (not shown) can be connected within the bore 502 in the conventional manner.

It is to be noted that the combustion system of the present invention effects supercompression of air only as opposed to the compression of an air-fuel mixture heretofore known in the art. Further the supercompressed air is employed to pick up the fuel charge and carry it into the combustion chamber. The use of a convergent-divergent venturi aids in drawing the fuel into proximity with the supercompressed air and in admixing the charges due to relatively high turbulence within the high velocity-low pressure area of the venturi. A means is provided that, in combination with the venturi, effects a pressure differential on opposite sides of the fuel charge.

Further, the use of a differential area valve results in the injection of the entire portion of supercompressed air and fuel into the working cylinder, precluding entrapment thereof.

Another feature of the present invention is the angular relationship between the supercompressed air passages and the fuel passages that results in relatively efficient admixing of the air and fuel.

From the foregoing description it is apparent that the combustion system of the present invention, which provides for the simultaneous injection and ignition of a fuel into a combustion chamber of an internal combustion engine, reduces the deleterious effects of ignition lag and offers material advantages in terms of combustion, expansion, and thermal efficiencies. The problems heretofore attendant with the ignition of relatively lean mixtures and operation at low load conditions are substantially eliminated.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What I claim is:

1. A fuel injector-igniter for an internal combustion engine having an expansion chamber, said injector-igniter comprising a ram member having means for depositing a fuel charge in a fuel pre-chamber isolated from the expansion chamber, means cooperating with said ram member for compressing a fluid in isolated relationship with respect to the expansion chamber to a temperature sufficient to ignite said fuel, means for admixing the fluid with said fuel to ignite said fuel, and means for injecting said ignited fuel into the expansion chamber.

2. A fuel injector-igniter for an internal combustion engine having an expansion chamber, said injector-igniter comprising a fuel pre-chamber for isolating a fuel charge from the expansion chamber, orifice means in said fuel pre-chamber, means for compressing a charge of air in isolated relationship with respect to the expansion chamber to a temperature sufficient to ignite said fuel, means normally closing said orifice movable upon the occurrence of a pre-determined pressure of said air to open said orifice means and maintainable in the open condition by a relatively lower pressure comprising a convergent-divergent valve on one side of said fuel pre-chamber for reducing the pressure of said air charge upon passage therethrough and passage means communicating with said compressed air and with the other side of said fuel pre-chamber to induce a pressure differential on said fuel charge, acting to bias the fuel into the expansion chamber of the engine.

3. The injector-igniter of claim 2 wherein said passage means is relatively smaller in cross-sectional area than the constricted portion of said valve.

4. A fuel injector-igniter for an internal combustion engine having an expansion chamber, said injector-igniter comprising a cylinder, a plunger reciprocable within said cylinder and having a compression chamber therein, an air annulus at one end of said plunger communicating with said compression chamber, a fuel pre-chamber in said plunger for isolating a fuel charge from the expansion chamber and including a fuel annulus and a passage means extending between said fuel annulus and fuel pre-chamber, a tubular ram member fixedly supported by said cylinder and slidable within said plunger and having a valve at one end of said ram member, a fuel pump having a piston slidable longitudinally of and with respect to said cylinder, a first check valve openable upon movement of said piston in one direction to pump fuel into said ram member, a second check valve openable upon movement of said piston in the opposite direction to admit fuel into said pump, and a valve normally closing said fuel annulus and said air annulus and openable upon the occurrence of a predetermined air pressure in said compression chamber to provide communication between said air and fuel annuli whereby said air is admixed with said fuel to ignite said fuel.

5. A fuel injector-igniter for an internal combustion engine having an expansion chamber, said injector-igniter comprising a cylinder, a plunger reciprocable within said cylinder and having a compression chamber therein, an air annulus at one end of said plunger communicating with said compression chamber, a fuel pre-chamber in said plunger for isolating a fuel charge from the expansion chamber and including a fuel annulus and a passage means extending between said fuel annulus and fuel pre-chamber, a tubular ram member slidable within said plunger and having a valve at one end, a fuel pump having a piston slidable longitudinally of and with respect to said cylinder, a first check valve openable upon movement of said piston in one direction to pump fuel into said ram member, a second check valve openable upon movement of said piston in the opposite direction to admit fuel into said pump, a valve normally closing said fuel annulus and said air annulus and openable upon the occurrence of a predetermined air pressure in said compression chamber to provide communication between said air and fuel annuli whereby said air is admixed with said fuel to ignite said fuel, and means within said cylinder operative upon said piston upon the occurrence of said predetermined air pressure to effect movement thereof in said one direction.

6. A fuel injector-igniter for an internal combustion engine having an expansion chamber, said injector-igniter comprising a cylinder having an aperture therein, a plunger reciprocable within said cylinder having means for closing one end of said cylinder with respect to said aperture and having a compression chamber therein, an air annulus at one end of said plunger communicating with said compression chamber, a fuel pre-chamber in said plunger for isolating a fuel charge from the expansion chamber and including a fuel annulus and a passage means extending between said fuel annulus and fuel pre-chamber, a tubular ram member fixedly supported by said cylinder and slidable within said plunger and having a valve at one end of said ram member, a fuel pump having a piston slidable longitudinally of and with respect to said cylinder in one direction subsequent to closure of said aperture and upon movement of said plunger toward said fuel pump, a first check valve openable upon movement of said piston in said one direction to pump fuel into said ram member, a second check valve openable upon movement of said piston in the opposite direction to admit fuel into said pump, and a valve normally closing said fuel annulus and said air annulus and openable upon the occurrence of a predetermined air pressure in said compression chamber to provide communication between said air and fuel annuli, whereby said air is admixed with said fuel to ignite said fuel.

7. A fuel injector-igniter for an internal combustion engine having an expansion chamber, said injector-igniter comprising a cylinder, a plunger reciprocable within said cylinder and having a compression chamber therein, an air annulus at one end of said plunger communicating with said compression chamber, a fuel pre-chamber in said plunger for isolating a fuel charge from the expansion chamber and including a fuel annulus and a passage means extending between said fuel annulus and fuel pre-chamber, a tubular ram member fixedly supported by said cylinder and slidable within said plunger and having a valve at one end of said ram member, a fuel pump having a piston slidable longitudinally of and with respect to said cylinder, a first check valve openable upon movement of said piston in one direction to pump fuel into said ram member, a second check valve openable upon movement of said piston in the opposite direction to admit fuel into said pump, and a valve having a convergent section normally closing said fuel annulus and said air annulus and a divergent section communicating with said convergent section to define a venturi, said valve being openable upon the occurrence of a predetermined air pressure in said compression chamber to provide communication between said air and fuel annuli whereby said air is admixed with said fuel to ignite said fuel.

8. A fuel injector-igniter for an internal combustion engine having an expansion chamber, said injector-igniter comprising a cylinder having an aperture therein, a plunger reciprocable within said cylinder and having means for closing one end of said cylinder with respect to said aperture, said plunger having a compression chamber therein, an air annulus at one end of said plunger communicating with said compression chamber, a fuel pre-chamber in said plunger for isolating a fuel charge from the expansion chamber and including a fuel annulus and a passage means extending between said fuel annulus and fuel pre-chamber, a tubular ram member slidable within said plunger and having a valve at one end and an aperture at the other end, said plunger having means for closing said last-mentioned aperture subsequent to closure of the aperture in said cylinder, a fuel pump having a piston slidable longitudinally of and with respect to said cylinder, a first check valve openable upon movement of said piston in one direction to pump fuel into said ram member, a second check valve openable upon movement of said piston in the opposite direction to admit fuel into said pump, and a valve normally closing said fuel annulus and said air annulus and openable upon the occurrence of a predetermined air pressure in said compression chamber to provide communication between said air and fuel annuli whereby said air is admixed with said fuel to ignite said fuel.

9. A fuel injector-igniter for an internal combustion engine having an expansion chamber, said injector-igniter comprising a cylinder, a plunger reciprocable within said cylinder and having a compression chamber therein, an air annulus at one end of said plunger communicating with said compression chamber, a fuel pre-chamber in said plunger for isolating a fuel charge from the expansion chamber and including a fuel annulus and a passage means extending between said fuel annulus and fuel pre-chamber, a tubular ram member slidable within said plunger and having a valve at one end of said ram member, a fuel pump having a piston slidable longitudinally of and with respect to said cylinder, a first check valve openable upon movement of said piston in one direction to pump fuel into said ram member, a second check valve openable upon movement of said piston in the opposite direction to admit fuel into said pump, a valve normally closing said fuel annulus and said air annulus and openable upon the occurrence of a predetermined air pressure in said compression chamber to provide communication between said air and fuel annuli whereby said air is admixed with said fuel to ignite said fuel, and means for opening said ram valve subsequent to closure of said last-mentioned valve to admit air and fuel into said compression chamber and fuel pre-chamber, respectively.

References Cited in the file of this patent

UNITED STATES PATENTS

| 2,203,669 | Butler | June 11, 1940 |
| 2,642,315 | French | June 16, 1953 |

FOREIGN PATENTS

| 469,107 | France | May 11, 1914 |